Feb. 11, 1958     C. F. DREXEL     2,822,667
PROPELLANT FEED SYSTEM
Filed Feb. 3, 1954
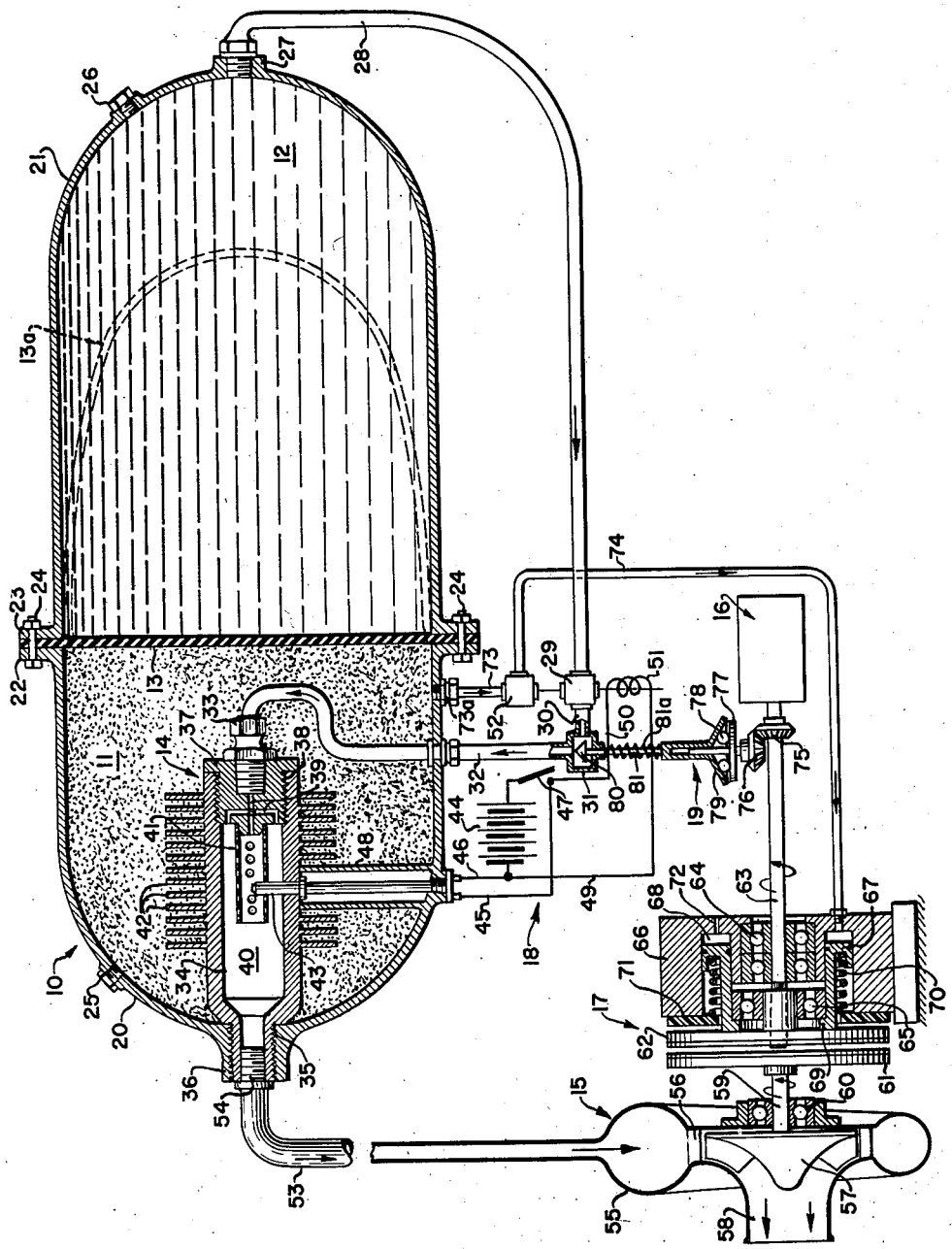
CHARLES F. DREXEL,
INVENTOR.
BY *John H. F. Wallace*

United States Patent Office 2,822,667
Patented Feb. 11, 1958

2,822,667

PROPELLANT FEED SYSTEM

Charles F. Drexel, Los Angeles, Calif., assignor to The Garrett Corporation, Los Angeles, Calif., a corporation of California Application February 3, 1954, Serial No. 407,891

19 Claims. (Cl. 60—39.48)

The present invention relates generally to a propellant feed apparatus and relates more particularly to a system and apparatus for utilizing normally wasted heat energy for effecting feeding of a propellant to a combustion chamber for combustion or decomposition therein.

While the present invention relates primarily to a device for supplying the products of decomposition of a liquid monopropellant and also to a means for storing a monopropellant fuel whereby such fuel may be instantaneously available, it will be understood that the invention may also be applied to propellant fuel systems involving and utilizing more than a single propellant and to fuel systems which rely upon combustion of a fuel with air or other combustion-supporting media. It is also to be understood that, while the device of the present invention is adapted primarily for use in short duration applications, under certain conditions of operation and with certain types of fuel, operation may be extended to prolonged use. The duration of operation of the device of the present invention must necessarily be limited to the available quantity of and pressure head on the propellant or propellants and the characteristics of such propellants.

In various types of installations, especially aboard aircraft or vessels, a short duration supply of power is often desirable. Such power may be converted into electrical, hydraulic or mechanical energy which in turn may be used as a driving means for vehicles of various kinds as a means for starting engines or for emergency power applications in aircraft or elsewhere. It is also desirable that such sources of power be self-contained, relatively simple and compact.

It is, accordingly, one object of the present invention to provide a propellant system wherein energy derived from combustion or decomposition of a propellant it utilized to effect feeding thereof.

It is another object of the present invention to provide a propellant feed system having control means for controlling the flow of such propellant, said control means being responsive to the speed of a driven fluid motor.

A further object of the present invention is to provide a fluid motor control and propellant feed system wherein clutch means are provided intermediate such fluid motor and a load thereof, the clutch means being operable in response to expansion of a gas induced by heat energy derived from combustion or decomposition of the propellant.

A still further object of the present invention is to provide a device for producing products of decomposition wherein heat energy derived from such decomposition may be utilized to effect expansion of a gas, such gas acting as a source of pressure for delivering a propellant from a suitable container to a point of combustion.

Other and further important objects of the invention will become apparent from the disclosures in the following specification, appended claims, and accompanying drawing, wherein the single figure schematically illustrates the propellant feed apparatus and system of the present invention.

With reference to the drawing, the propellant feed apparatus of the present invention comprises generally an accumulator or container 10 which is divided into a gas chamber 11 and a propellant chamber 12 by means of a transversely extending movable or distensible wall or diaphragm 13. A relatively small combustion chamber, indicated generally at 14, is disposed in the chamber 11 and adapted to receive propellant from the chamber 12 for combustion or decomposition therein, the combustion products therefrom being delivered to a fluid driven motor such as illustrated by a turbine 15. In one form of use of the present invention, the turbine 15 may be operatively connected to a suitable load, indicated generally at 16, through a clutch mechanism 17. Electrical means, indicated generally at 18, is also provided in order to initiate operation of the propellant feed system, the driving speed of the device being controlled by a governor arrangement indicated generally at 19.

The container 10 may assume a generally ovoid configuration with one portion 20 enclosing the chamber 11 and a larger portion 21 enclosing the chamber 12. The portions 20 and 21 are flanged at 22 and 23 and may be secured together by bolts 24 with the peripheral edge of the diaphragm 13 clamped therebetween. Capped filling openings 25 and 26 may also be provided in the walls of the portions 20 and 21 respectively.

One end of the portion 21, of the container 10, is provided with a boss 27 through which connection may be made with a conduit 28. The conduit 28 communicates with an electromagnetically operated primary flow control valve 29 and, from the valve 29, through a short conduit 30 to a secondary flow control valve 31. From the valve 31, a conduit 32 is operatively connected to the wall of the portion 20 and extends through this wall to a fitting 33 connected to a rearward portion of the combustion chamber 14.

As shown in the drawing, the combustion chamber 14 includes an elongated outer housing 34 that is reduced in diameter as at 35, this reduced diameter portion being disposed for threaded engagement in a boss 36 which extends outwardly from the portion 20 of the container 10. The rearward portion of the combustion chamber 14 is fitted with an insert 37 that makes threaded connections at 38 with the housing 34, the fitting 33 being threadably disposed in the insert 37. A plurality of exit passages 39 extend through the insert 37 from the fitting 33 for conducting propellant into the interior 40 of the combustion chamber 14. The open ends of the passages 39 form spray openings for the propellant. A flame tube 41 is disposed axially within the interior 40 of the combustion chamber 14, at least one of the passages 39 communicating with the interior of the flame tube 41. In order to increase the heat transfer from the exterior of the combustion chamber housing 34, a plurality of radially extending heat exchange fins 42 are disposed along the major length of the housing.

Without departing from the scope of the present invention, it may be seen and it should be understood that the combustion chamber 14 may assume various shapes and have various detail arrangements depending upon the type of propellant utilized with the system and upon the necessary means for igniting or effecting decomposition of this propellant.

In instances where combustion or decomposition of the propellant must be initiated, an ignition device which may take the form of a glow or spark plug 43, for example, has a body disposed through the wall of the combustion chamber with the operative portion thereof extending into the interior of the flame tube 41. As shown, the plug 43 may be supplied with electrical energy from a battery 44 through conductors 45 and 46. Energization of the ignition plug is accomplished by the closing of a switch 47 which connects one of the battery terminals to conductor 45 to complete the electric circuit. A tube 48 is disposed between the inner wall of the portion 20 of the container 10 and the exterior of the housing 34 of the combustion chamber in order to protect the electrical connections of the ignition plug against heat, deterioration and corrosion.

Upon closing the switch 47, the battery 44 is also electrically connected through conductors 49 and 50 with a coil 51 that is disposed and adapted to operate the primary flow control valve 29 and an electromagnetically operated gas flow control valve 52. For a purpose to be hereinafter more fully described the valves 29 and 52 are normally closed and adapted to be opened upon energization of the coil 51.

The discharge of hot combustion products or products of decomposition from the combustion chamber 14 are conducted through a conduit 53 which makes threaded connection, as at 54, with the reduced diameter portion 35 from the housing 34. These combustion products may be utilized for any desired purpose, such as, for example, for driving the turbine 15. In accordance with conventional practice, the combustion products are conducted into a scroll 55 and from the scroll through a nozzle 56 to thereafter impinge upon and drive a turbine wheel 57, the combustion products discharging from the wheel 57 through a passage 58.

The turbine wheel 57 is connected to a stub shaft 59 which is in turn journaled in a bearing 60 and extends to and supports a clutch plate 61. A second clutch plate 62 is axially aligned with the clutch plate 61 and is supported for sliding movement on the splined end of a shaft 63, which extends to the load 16 to drive it. The shaft 63 and the clutch plate 62 are journaled in a pair of bearings 64 and a thrust bearing 65 respectively, these bearings being supported within a housing 66 of the clutch mechanism 17.

The clutch mechanism 17 has an annular piston 67 that is reciprocally mounted in an annulus 68 formed in the clutch housing 66. The piston 67 has an inwardly extending lip 69 that engages the thrust bearing 65, the construction being such that, upon reciprocal movement of the piston 67, the clutch plate 62 together with the thrust bearing 65 will be moved axially along the splined end of the shaft 63 so that friction surfaces of the clutch plates 61 and 62 may be brought into engagement with each other. A compression spring 70 is disposed in the annulus 68 intermediate the piston 67 and a braking disc 71, in order to bias the clutch plate 62 out of engagement with the clutch plate 61. For a purpose to be hereinafter more fully described, an orifice 72 extends through the wall of the housing and provides a communication between the interior of the annulus 68 and the ambient atmosphere.

In order to provide means for energizing the clutch 17, a short section of conduit 73 is connected by a fitting 73a for communication with chamber 11. The conduit 73 extends to the gas flow control valve 52, a second conduit 74 extending from the valve 52 to the clutch 17 and communicating with the annulus 68. It may thus be seen that, upon energization of the coil 51, the valve 52 will be opened to permit the transmission of gas under pressure from the chamber 11 to the annulus 68 of the clutch, thereby to axially move the piston 67 and effect engagement of the clutch plates 61 and 62.

For proper operation of the device of the present invention, it is desirable that the speed of the turbine 15, together with the speed of the driven load 16, be maintained at a constant rate. To accomplish this regulation, a bevel gear 75 is connected to and adapted to be driven by the shaft 63, the gear 75 being in mating contact with a second bevel gear 76 which is connected to and positioned to drive the governor 19. The governor 19 comprises a substantially horizontally disposed plate 77 that is adapted to support a plurality of flyballs 78 which are normally retained in position adjacent the central area of the plate 77 by means of an inverted cone structure 79. Upon rotation of the plate 77, the flyballs 78 move outwardly to actuate the cone in a direction axially away from the plate 77. The cone 79 is connected to a valve member 80, of the valve 31, by a rod 81, the cone 79 being biased toward the plate 77 by a compression spring 81a positioned between the housing of the valve 31 and the cone structure, this compression spring also serving to bias the valve member 80 toward an open position.

It may be seen that the at-rest position of the propellant feed apparatus of the present invention is substantially as indicated in the drawing, with the diaphragm 13 in substantially the position indicated, the chamber 11 filled with a suitable gas such as, for example, nitrogen, and the chamber 12 filled with a suitable propellant or monopropellant such as, for example $C_2H_4O$. As previously stated, electromagnetically operated valves 29 and 52 are normally closed when the system is not in operation. The flow control valve 31 is open at this time, and the clutch 17 is held disengaged by means of the action of the compression spring 70. The gas in the chamber 11 is placed there under pressure in order to establish an initial head against diaphragm 13 tending to expel the propellant from the chamber 12 through the conduit 28.

Upon closing of the switch 47, electrical energy is supplied by the battery in order to energize the ignition plug 43 and simultaneously to open the valves 29 and 52. By means of the valve 29, the propellant is admitted from the conduit 28 to the conduit 32 and into the combustion chamber 14 wherein combustion or decomposition takes place. Hot combustion products are thereafter delivered to the conduit 53 and then to the scroll 55 of the turbine 15, and serve to drive the wheel 57 and the clutch plate 61. Simultaneously, the valve 52 serves to admit high pressure gas from the chamber 11, through the conduit 74 and to the annulus 68 of the clutch mechanism 71, to move the piston 67 axially in the annulus thereby to compress the spring 70 and effect contact between the clutch plates 61 and 62 to place the turbine 15 in driving engagement with the shaft 63 and the load 16. A constant flow of the gas from the annulus 68 is maintained through the orifice 72; however, the orifice 72 is of a sufficiently small size as to permit retention of a high enough pressure within the annulus 68 to maintain the clutch plates 61 and 62 in driving engagement with each other.

As the propellant is consumed within the combustion chamber 14, heat developed therein is conducted from the housing 34 of the combustion chamber through the fins 42 and, by heat exchange with the gas in the chamber 11, produces a thermal expansion of the gas thereby to maintain the pressure of the gas in the chamber 11 at a level sufficient to insure adequate expulsion of the propellant through movement of the diaphragm 13 in the direction of the chamber 12, as indicated by the dotted lines 13a. The pressure head thus maintained on the propellant from the chamber 12 causes continuous flow of the propellant outward through the conduit 28 and to the combustion chamber 14. Additionally, the gas within the chamber 11 is maintained at a sufficient pressure level to insure adequate engagement of the clutch plates 61 and 62 of the clutch 17.

As the speed of the turbine 15, and the driven load 16, increases, the governor 19 will operate to move the valve member 80 of the secondary propellant flow control valve 31, toward closed position thereby restricting the flow of the propellant from the chamber 12 through the conduit 28 and to the combustion chamber 14. The restriction of such propellant flow serves to reduce the speed of the turbine 15. When the propellant within the chamber 12 has been exhausted or when the switch 47 is opened, the turbine 15 may continue to rotate for a short period; however, a drop in pressure will be experienced at once in the gas within the chamber 11, thereby to reduce the flow of such gas through the conduit 73, valve 52, and conduit 74 and permit the gas within the annulus 68 to bleed down through the orifice 72. A similar action will take place, in reducing or stopping gas flow to the annulus 68, in the event the switch 47 is opened thus to close the valve 52. This action will permit the compression spring 70 to overcome the force of the gas within the annulus 68 and effect disengagement of the clutch plates 61 and 62 thereby disconnecting the turbine 15 from the load 16. It will be understood that valve 52 may take the form of a dual purpose valve that would vent the gas from the annulus 68 as rapidly as might be desired upon de-energization of the valve.

Upon continued movement of the clutch plate 62 away from clutch plate 61, the surface of this plate opposite the surface which engages the plate 61, is adapted to engage the braking disc 71 to apply a braking action to the clutch plate 62, shaft 63 and load 16, thereby to arrest the load immediately.

It may be seen that, through use of the present system, with the combustion chamber 14 being located in the gas containing chamber 11, a portion of the energy of combustion or decomposition of the propellant is given up to the gas within the chamber 11 in order to maintain or raise its temperature and pressure during operation of the system. Thus a smaller volume is necessary for the container 10, and specifically for the chamber 11, than would otherwise be required in systems depending entirely upon the initial pressure of the gas to force the propellant from the chamber 12. Conversely, in a container of a given size a lower initial gas pressure may be employed.

It may be seen that the heat transfer fins 42, incorporated on the exterior of the combustion chamber 14, may be replaced by other means for transferring heat to the stored gas within the chamber 11 in order that the high pressure of the gas may be maintained at the desired temperature or on any predetermined schedule of desired temperatures and pressure. In conventional systems, the heat that is radiated from the combustion chamber is normally wasted. Therefore, the utilization of this heat to raise the temperature and permit isothermal expansion of the gas, rather than radiation of the excess heat of combustion to the surroundings, or convection and conduction to the ambient atmosphere through the associated components of the device, enables the present system to provide a more highly efficient propellant feed and fuel supply system than has heretofore been known.

It will be understood that the sequence in which the valves 29 and 52 are operated may be varied, depending on the particular purpose for which the propellant feed system of the invention is designed. In particular, it is feasible to open the valve 52 before the ignition plug 43 is energized and before the valve 29 is opened, thereby to engage the clutch plates 61 and 62 even before the turbine 15 begins to operate. In some instances this may be advantageous because the torque of a turbine is at a maximum when the turbine blades are stationary.

I claim:

1. In a combustible propellant feed apparatus for use with a fluid driven motor: a container; a movable wall dividing said container into propellant and gas chambers; a combustion chamber, said combustion chamber being disposed in said gas chamber to permit direct transfer of heat energy therefrom to gas in said gas chamber, thereby to cause thermal expansion of said gas; means for conducting propellant from said propellant chamber to said combustion chamber for combustion therein; and means for conducting combustion products from said combustion chamber to said motor.

2. In a combustible propellant feed apparatus for use with a fluid driven motor: a container; a movable wall dividing said container into propellant and gas chambers; a combustion chamber, said combustion chamber being disposed in said gas chamber to permit direct transfer of heat energy therefrom to gas in said gas chamber, thereby to cause thermal expansion of said gas; means for conducting propellant from said propellant chamber to said combustion chamber for combustion therein; means for conducting combustion products from said combustion chamber to said motor for driving it; and means responsive to the speed of said motor for controlling the flow of said propellant to said combustion chamber.

3. In a fluid motor driving system: a container; a movable wall dividing said container into propellant and gas chambers; a combustion chamber, said combustion chamber being disposed relative to said gas chamber in a manner permitting transfer of heat energy therefrom to gas in said gas chamber, thereby to cause thermal expansion of said gas; means for conducting propellant from said propellant chamber to said combustion chamber for combustion therein; means for conducting combustion products from said combustion chamber to said motor for driving it; and means responsive to gas pressure created by the expansion of said gas for connecting said motor with a load.

4. In a fluid motor driving system: a container; a movable wall dividing said container into propellant and gas chambers; a combustion chamber, said combustion chamber being disposed relative to said gas chamber in a manner permitting transfer of heat energy therefrom to gas in said gas chamber, thereby to cause thermal expansion of said gas; means for conducting propellant from said propellant chamber to said combustion chamber for combustion therein; means for conducting combustion products from said combustion chamber to said motor for driving it; and means responsive to the pressure of gas from said gas chamber for connecting said motor with a load.

5. In a fluid motor driving system: a container; a movable wall dividing said container into propellant and gas chambers; a combustion chamber, said combustion chamber being disposed in said gas chamber to permit transfer of heat energy therefrom to gas in said gas chamber, thereby to cause thermal expansion of said gas; means for conducting propellant from said propellant chamber to said combustion chamber for combustion therein; means for conducting combustion products from said combustion chamber to said motor for driving it; means responsive to the speed of said motor for controlling flow of said propellant to said combustion chamber; and means responsive to gas pressure created by the expansion of said gas for connecting said motor with a load.

6. In a fluid motor driving system: a container; a movable wall dividing said container into propellant and gas chambers; a combustion chamber, said combustion chamber being disposed in said gas chamber to permit transfer of heat energy therefrom to gas in said gas chamber, thereby to cause thermal expansion of said gas; means for conducting propellant from said propellant chamber to said combustion chamber for combustion therein; means for conducting combustion products from said combustion chamber to said motor for driving it; means responsive to the speed of said motor for controlling flow of said propellant to said combustion chamber; and means responsive to the pressure of gas from said gas chamber for connecting said motor with a load.

7. A fluid motor drive control and propellant feed apparatus comprising: a container; a movable partition for dividing said container into dual portions forming a gas chamber and a propellant chamber; a combustion chamber having at least a portion thereof disposed in said gas chamber whereby, upon combustion therein, heat energy therefrom will be transmitted to gas in said gas chamber, thereby to cause thermal expansion of said gas; conduit means for conducting propellant from said propellant chamber to said combustion chamber; ignition means associated with said combustion chamber; propellant control valve means for controlling flow of said propellant through said conduit means to said combustion chamber; means for conducting combustion products from said combustion chamber to said fluid motor for driving same; a load adapted to be driven by said fluid motor; and a clutch disposed intermediate said fluid motor and said load, said clutch being movable for engagement in response to the expansion of said gas in said gas chamber.

8. A fluid motor drive control and propellant feed apparatus comprising: a container; a movable partition for dividing said container into dual portions forming a gas chamber and a propellant chamber; a combustion chamber having at least a portion thereof disposed in said gas chamber whereby, upon combustion therein, heat energy therefrom will be transmitted to gas in said gas chamber, thereby to cause thermal expansion of said gas; conduit means for conducting propellant from said propellant chamber to said combustion chamber; ignition means associated with said combustion chamber; propellant control valve means for controlling flow of said propellant through said conduit means to said combustion chamber; means for conducting combustion products from said combustion chamber to said fluid motor for driving same; a load adapted to be driven by said fluid motor; and a clutch disposed intermediate said fluid motor and said load, said clutch being movable for engagement in response to the pressure of said gas from said gas chamber.

9. A fluid motor drive control and propellant feed apparatus comprising: a container; a movable wall for dividing said container into dual portions forming a gas chamber and a propellant chamber; a combustion chamber having at least a portion thereof disposed in said gas chamber whereby, upon combustion therein, heat energy therefrom will be transmitted to gas in said gas chamber, thereby to cause thermal expansion of said gas; conduit means for conducting propellant from said propellant chamber to said combustion chamber; ignition means associated with said combustion chamber; propellant control valve means for initiating flow of said propellant through said conduit means to said combustion chamber; means for conducting combustion products from said combustion chamber to said fluid motor for driving same; a load adapted to be driven by said fluid motor; a clutch disposed intermediate said fluid motor and said load; conduit means for conducting said gas to said clutch, said clutch being movable for engagement in response to the expansion of said gas in said gas chamber; and gas control valve means for controlling the flow of said gas to said clutch, said valve being operable simultaneously with operation of said propellant control valve means.

10. A fluid motor drive control and propellant feed apparatus comprising: a container; a movable partition for dividing said container into dual portions forming a gas chamber and a propellant chamber; a combustion chamber having at least a portion thereof disposed in said gas chamber whereby, upon combustion therein, heat energy therefrom will be transmitted to gas in said gas chamber, thereby to cause thermal expansion of said gas; conduit means for conducting propellant from said propellant chamber to said combustion chamber; ignition means associated with said combustion chamber; propellant control valve means for initiating flow of said propellant through said conduit means to said combustion chamber; means for conducting combustion products from said combustion chamber to said fluid motor for driving same; a load adapted to be driven by said fluid motor; a clutch disposed intermediate said fluid motor and said load; conduit means for conducting said gas to said clutch, said clutch being movable for engagement in response to the expansion of said gas in said gas chamber; gas control valve means for controlling the flow of said gas to said clutch, said valve being operable simultaneously with operation of said propellant control valve means; and means for disengaging said clutch and applying a braking action on said load upon a drop in the pressure of said expanding gas.

11. A fluid motor drive control and propellant feed apparatus comprising: a container; a flexible diaphragm for dividing said container into dual portions forming a gas chamber and a propellant chamber; a combustion chamber, said combustion chamber being disposed in said gas chamber whereby, upon combustion therein, heat energy therefrom will be transmitted to gas in said gas chamber, thereby to cause thermal expansion of said gas; conduit means for conducting propellant from said propellant chamber to said combustion chamber; ignition means associated with said combustion chamber; primary propellant control valve means operable simultaneously with energization of said ignition means for initiating flow of said propellant through said conduit means to said combustion chamber; means for conducting combustion products from said combustion chamber to said fluid motor for driving same; secondary propellant control valve means disposed in said conduit means, said secondary valve means being movable in response to speed changes of said fluid motor; a load adapted to be driven by said fluid motor; and a clutch disposed intermediate said fluid motor and said load.

12. A fluid motor drive control and propellant feed apparatus comprising: a container; a flexible diaphragm for dividing said container into dual portions forming a gas chamber and a propellant chamber; a combustion chamber having external radially extending fins, said combustion chamber being disposed in said gas chamber whereby, upon combustion therein, heat energy therefrom will be transmitted to gas in said gas chamber, thereby to cause thermal expansion of said gas; conduit means for conducting propellant from said propellant chamber to said combustion chamber; ignition means associated with said combustion chamber; electromagnetic primary propellant control valve means operable simultaneously with energization of said ignition means for initiating flow of said propellant through said conduit means to said combustion chamber; means for conducting combustion products from said combustion chamber to said fluid motor for driving same; secondary propellant control valve means disposed in said conduit means, said secondary valve means being movable toward a closed position; a governor for effecting movement of said secondary valve, said governor being in turn adapted for actuation in response to speed changes of said fluid motor; a load adapted to be driven by said fluid motor; a clutch disposed intermediate said fluid motor and said load, said clutch being movable for engagement in response to the expansion of said gas in said gas chamber; and electromagnetic gas control valve means for controlling the flow of said gas to said clutch, said valve being operable simultaneously with operation of said primary propellant control valve means.

13. A power turbine control and propellant feed apparatus comprising: a container; a flexible diaphragm for dividing said container into dual portions forming a gas chamber and a propellant chamber; a combustion chamber having external radially extending fins, said combustion chamber being disposed in said gas chamber whereby, upon combustion therein, heat energy therefrom will be transmitted to gas in said gas chamber, thereby to cause thermal expansion of said gas; conduit means for conducting propellant from said propellant chamber to said combustion chamber; ignition means associated with said combustion chamber; electromagnetic primary propellant control valve means operable simultaneously with energization of said ignition means for initiating flow of said propellant through said conduit means to said combustion chamber; means for conducting combustion products from said combustion chamber to said turbine for driving same; secondary propellant control valve means disposed in said conduit means, said secondary valve means being movable toward a closed position; a governor for effecting movement of said secondary valve, said governor being in turn adapted for actuation in response to speed changes of said turbine; a load adapted to be driven by said turbine; a clutch disposed intermediate said turbine and said load; conduit means for conducting said gas to said clutch, said clutch being movable for engagment in response to the expansion of said gas in said gas chamber; electromagnetic gas control valve means for controlling the flow of said gas to said clutch, said valve being operable simultaneously with operation of said primary propellant control valve means; and means for disengaging said clutch and applying a braking action on said load upon a drop in the pressure of said expanding gas.

14. In a device for providing products of decomposition: a container; movable wall means disposed in said container to divide said container into a plurality of chambers, one of said chambers being adapted to retain a gas under pressure, another of said chambers being adapted to retain a liquid propellant; a combustion chamber positioned in said gas-filled chamber; a conduit for conducting said propellant to said combustion chamber; and means for igniting said propellant in said combustion chamber, whereby heat energy from decomposition of said propellant in said combustion chamber is transmitted to said gas to cause thermal expansion thereof and movement of said wall means toward said other of said chambers, thereby to expel said propellant therefrom.

15. In a device for providing products of decomposition: a container; a flexible diaphragm disposed across said container to divide said container into a pair of chambers, one of said chambers being adapted to retain a gas under pressure; the other one of said chambers retaining a liquid propellant; a combustion chamber positioned in said gas-filled chamber; an extended surface projecting from the exterior of said combustion chamber; a conduit for conducting said propellant to said combuston chamber; and means for igniting said propellant in said combustion chamber, whereby heat energy from said propellant in said combustion chamber is transmitted to said gas to cause thermal expansion thereof and deformation of said diaphragm toward said other one of said chambers, thereby to expel said propellant therefrom.

16. In a device for providing products of decomposition: a container; a flexible diaphragm disposed across said container to divide said container into a pair of chambers, one of said chambers being adapted to retain a gas under pressure; the other one of said chambers retaining a liquid propellant; a combustion chamber positioned in said gas-filled chamber; a plurality of members projecting outwardly from the exterior of said combustion chamber; a conduit for conducting said propellant to said combustion chamber; means for igniting said propellant in said combustion chamber, whereby heat energy from decomposition of said propellant in said combustion chamber is transmitted to said gas to cause thermal expansion thereof and deformation of said diaphragm toward said other one of said chambers thereby to expel said propellant therefrom; and valve means in said conduit operable simultaneously with energization of said igniting means for controlling the flow of said propellant to said combustion chamber.

17. In a device for providing products of decomposition: a container; a flexible member dividing said container into first and second fluid tight chambers; a heat generator having a combustion chamber disposed substantially centrally of said first chamber to be surrounded by and transfer heat directly to fluid therein; passage means leading from said combustion chamber to the exterior of said container; additional passage means establishing communication between the second fluid tight chamber and said combustion chamber to conduct fuel from the former to the latter; and valve means in said additional passage means to control fuel flow to said combustion chamber.

18. In a device for providing products of decomposition: a container; a flexible member dividing said container into first and second fluid tight chambers; a combination heat generator and exchanger having a combustion chamber disposed substantially centrally of said first chamber to be surrounded by and in direct heat transfer relation to fluid therein; passage means leading from said combustion chamber to the exterior of said container; additional passage means establishing communication between the second fluid tight chamber and said combustion chamber to conduct fuel from the former to the latter; and valve means in said additional passage means to control fuel flow to said combustion chamber.

19. In a device for providing products of decomposition: a container; a flexible member dividing said container into first and second fluid tight chambers; a combination heat generator and exchanger having a body with externally disposed heat dissipating fins and an internal combustion chamber disposed substantially axially of said first chamber to be surrounded by and in direct heat transfer relation to fluid therein; passage means leading from said combustion chamber to the exterior of said container; additional passage means establishing communication between the second fluid tight chamber and said combustion chamber to conduct fuel from the former to the latter; and valve means in said additional passage means to control fuel flow to said combustion chamber.

References Cited in the file of this patent

UNITED STATES PATENTS

| 2,505,798 | Skinner | May 2, 1950 |
| 2,531,761 | Zucrow | Nov. 28, 1950 |
| 2,576,984 | Wildhack | Dec. 4, 1951 |
| 2,701,441 | Mitchell | Feb. 8, 1955 |
| 2,754,657 | Ehorn | July 17, 1956 |

FOREIGN PATENTS

| 695,048 | Great Britain | Aug. 5, 1953 |